＊Jan. 12, 1999

United States Patent [19]

Frank et al.

[11] Patent Number: 5,858,047
[45] Date of Patent: *Jan. 12, 1999

[54] METHOD AND APPARATUS OF BENDING GLASS SHEETS

[75] Inventors: Robert G. Frank, Sarver, Pa.; Mark A. Cancilla, Rochester Hills, Mich.

[73] Assignee: PPG Industries, Inc., Pittsburgh, Pa.

[*] Notice: The term of this patent shall not extend beyond the expiration date of Pat. No. 5,286,271.

[21] Appl. No.: 606,617

[22] Filed: Feb. 26, 1996

Related U.S. Application Data

[63] Continuation-in-part of Ser. No. 195,406, Feb. 14, 1994, abandoned.

[51] Int. Cl.⁶ .................................................. C03B 23/02
[52] U.S. Cl. ............................. 65/104; 65/106; 65/118; 65/268; 65/287; 65/348
[58] Field of Search .............................. 65/104, 106, 268, 65/273, 287, 289, 118, 348, 107

[56] References Cited

U.S. PATENT DOCUMENTS

| | | | |
|---|---|---|---|
| 3,527,589 | 9/1970 | Ritter, Jr. | 65/289 |
| 4,123,246 | 10/1978 | Johnson | 65/104 |
| 4,204,854 | 5/1980 | McMaster et al. | 65/106 |
| 4,221,580 | 9/1980 | Frank | 65/104 |
| 4,272,274 | 6/1981 | Frank et al. | 65/273 |
| 4,305,746 | 12/1981 | Hagedorn et al. | 65/106 |
| 4,311,509 | 1/1982 | Reader et al. | 65/351 |
| 4,381,933 | 5/1983 | Schultz et al. | 65/106 |
| 4,433,993 | 2/1984 | Frank | 65/104 |
| 4,437,871 | 3/1984 | McMaster et al. | 65/104 |
| 4,496,386 | 1/1985 | Hymore et al. | 65/106 |
| 4,575,390 | 3/1986 | McMaster | 65/273 |
| 4,578,103 | 3/1986 | Fackelman | 65/182.2 |
| 4,579,573 | 4/1986 | Fecik et al. | 65/106 |
| 4,662,925 | 5/1987 | Thimons et al. | 65/104 |
| 4,738,704 | 4/1988 | Vanashcen et al. | 65/106 |
| 4,746,348 | 5/1988 | Frank | 65/104 |
| 4,767,434 | 8/1988 | Schwartz et al. | 65/29 |
| 4,830,650 | 5/1989 | Kelly | 65/106 |
| 4,956,001 | 9/1990 | Kitagawa et al. | 65/107 |
| 4,990,170 | 2/1991 | Vanaschen et al. | 65/104 |
| 5,004,491 | 4/1991 | McMaster et al. | 65/106 |
| 5,006,146 | 4/1991 | Mathivat et al. | 65/273 |
| 5,022,908 | 6/1991 | Honjo et al. | 65/268 |
| 5,026,414 | 6/1991 | Mathivat et al. | 65/106 |
| 5,286,271 | 2/1994 | Rueter et al. | 65/106 |
| 5,306,324 | 4/1994 | Vehmas et al. | 65/104 |
| 5,320,661 | 6/1994 | Fecik et al. | 65/268 |
| 5,330,550 | 7/1994 | Kuster et al. | 65/260 |
| 5,352,263 | 10/1994 | Kuster et al. | 65/106 |
| 5,472,469 | 12/1995 | Yli-Vakkuri et al. | 65/106 |

FOREIGN PATENT DOCUMENTS

| | | |
|---|---|---|
| 0 267 121 | 5/1988 | European Pat. Off. . |
| 0 494 823 | 7/1992 | European Pat. Off. . |
| 2 693 183 | 1/1994 | France . |
| 2 693 184 | 1/1994 | France . |

*Primary Examiner*—Steven P. Griffin
*Attorney, Agent, or Firm*—Andrew C. Siminerio

[57] ABSTRACT

An apparatus for shaping heat softened glass sheets includes a shaping station to receive a heat softened glass sheet to be shaped, first and second transfer stations positioned along opposing sides of the shaping station, and first and second cooling stations positioned adjacent a corresponding transfer station. An upper vacuum mold having first and second downwardly facing, shaped sheet engaging surfaces moves between the transfer stations and within the shaping station. The sheet engaging surfaces of the vacuum mold each have a shaped configuration generally corresponding to a final desired shaped of a glass sheet to be shaped. Heat softened glass sheets are positioned within the shaping station and moved into engagement with one of the sheet engaging surfaces to shape the sheet. Vacuum is drawn along the sheet engaging surface to hold the shaped sheet thereagainst. The mold then moves the shaped sheet and engaging surface to one of the transfer stations where the vacuum is discontinued to deposit the shaped sheet on a sheet support. The sheet support then transfers the shaped sheet to one of the cooling stations, where the shaped sheet is controllably cooled.

27 Claims, 5 Drawing Sheets

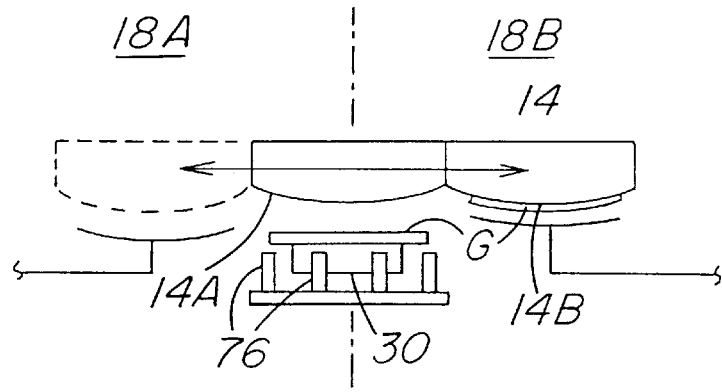
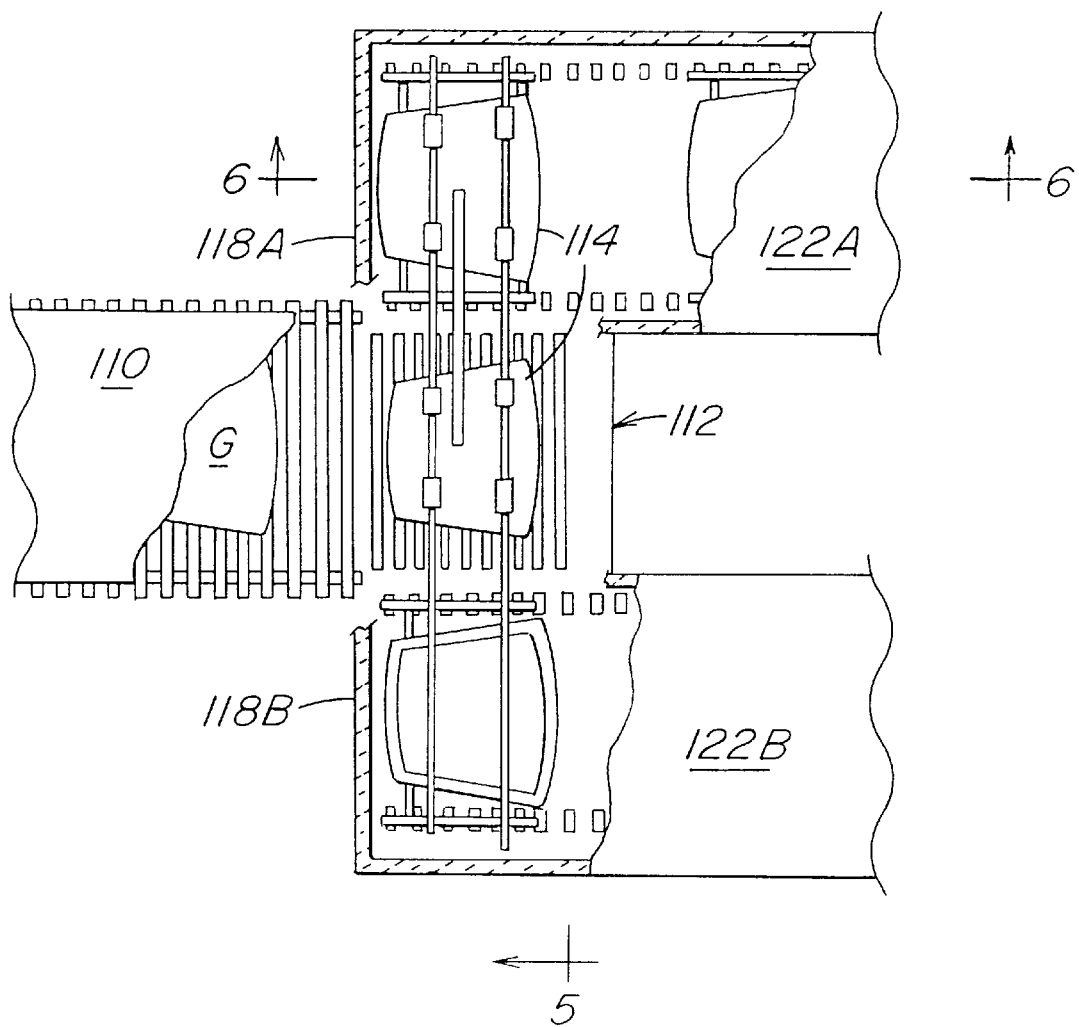

METHOD AND APPARATUS OF BENDING GLASS SHEETS

RELATED APPLICATIONS

This application is a continuation-in-part of U.S. Ser. No. 08/195,406, filed Feb. 14, 1994, now abandoned.

BACKGROUND OF THE INVENTION

This invention relates to bending of glass sheets and in particular to a glass sheet shaping system which utilizes a double-faced vacuum mold arrangement to shape and move heat softened glass sheets from a shaping station to two independent transferring and cooling stations.

Shaped glass sheets are widely used as windshields, side windows or rear windows in vehicles such as automobiles and the like. To be suitable for such applications, flat glass sheets must be shaped to precisely defined curvatures dictated by the shape and outline of the frames defining the window openings into which the glass windows are installed. It is also important that the windows meet stringent optical requirements and that they be free of optical defects that would tend to interfere with the clear viewing through their viewing area.

During fabrication, the glass sheets may be subjected to thermal treatment to control internal stresses. In particular, glass sheets used for windshields are normally annealed to reduce the internal stresses while glass sheets used for side windows or rear windows are tempered to induce compressive stresses in the major surfaces of the sheets and tensile stresses in the center regions. Tempering strengthens the glass and increases its resistance to damage resulting from impact.

In the heating and shaping of glass sheets for windshields, it is common practice to use contoured bending rings that support one or more flat glass sheets and convey it through a heating lehr. As the temperature of the glass increases and approaches its heat softening temperature, it begins to sag under the force of gravity and conforms to the contours of the shaping rails on the mold. If desired, additional presses may be used to shape the glass sheets while supported on the ring.

During the commercial production of tempered glass sheets for sidelights and backlights, a glass sheet is generally conveyed along a substantially horizontal path through a tunnel-type furnace, heated to its heat softening temperature and transferred into a shaping station adjacent the furnace where the glass sheet is shaped. After shaping, the shaped glass sheet is transferred to a cooling station where it is controllably cooled. The heat softened glass sheet may be shaped, for example, by pressing the sheet between a pair of upper and lower shaping surfaces such as that disclosed in U.S. Pat. No. 4,272,274 to Frank et al., U.S. Pat. No. 4,662,925 to Thimons et al. and U.S. Pat. No. 4,830,650 to Kelly. The glass sheets may also be formed by a shaping arrangement which incorporates two distinct shaping surfaces. For example, U.S. Pat. No. 5,286,271 to Rueter et al., glass sheets enter a shaping station and are pressed against one of the shaping surfaces of a mold having two shaping surfaces. The mold then transfers the shaped sheet to a series of curved conveying rolls which advance the glass sheet into a cooling station while supporting the glass to maintain its contoured configuration. U.S. Pat. No. 5,320,661 to Fecik et al. discloses an arrangement whereby flat glass sheets are lifted by a flat vacuum pickup and transferred to one of two shaping stations positioned adjacent to sheet pickup area where the sheet is pressed to shape. The sheet is then transferred onto a tempering ring and moved to a cooling station positioned near the corresponding shaping station.

It would be beneficial to have a glass sheet shaping arrangement that provides for high speed shaping of glass sheets while maintaining high optical quality and shape control and in addition allows for the shaping of successive glass sheets to different configurations.

SUMMARY OF THE INVENTION

The present invention provides an apparatus and method for shaping heat softened glass sheets which includes a shaping station to receive a heat softened glass sheet to be shaped, first and second transfer stations positioned along opposing sides of the shaping station, and first and second cooling stations positioned adjacent a corresponding transfer station. An upper vacuum mold having first and second downwardly facing, shaped sheet engaging surfaces moves between the transfer stations and within the shaping station. The sheet engaging surfaces of the vacuum mold each have a shaped configuration generally corresponding to a final desired shaped of a glass sheet to be shaped and are positioned relative to each other such that when the first engaging surface is within the shaping station, the second engaging surface is within the second transfer station and when the second engaging surface is within the shaping station, the first engaging surface is within the first transfer station. Heat softened glass sheets are positioned within the shaping station and engaged by one of the sheet engaging surfaces to shape the sheet. Vacuum is drawn along the sheet engaging surface to hold the shaped sheet thereagainst. The mold, with the shaped sheet held against one of the engaging surfaces then moves to position the shaped sheet at one of the transfer stations. As the mold moves, the next glass sheet enters the shaping station where it is subsequently engaged by the other sheet engaging surface to shape the sheet. When the first shaped sheet is positioned within the transfer station, the vacuum is discontinued to deposit the shaped sheet on a sheet support. The sheet support then transfers the shaped sheet to one of the cooling stations, where the shaped sheet is controllably cooled.

In one particular embodiment of the invention, the cooling stations are annealing chambers and each transfer station is positioned at the entry end of a corresponding annealing chamber. After shaping the sheet in the shaping station, the upper vacuum mold transfers the shaped sheet to a transfer station where the sheet is deposited onto an annealing ring at the entry end of an annealing chamber. The ring and sheet are conveyed through the chamber and after cooling, the sheet is removed and the ring is returned to the entry end of the annealing chamber.

DESCRIPTION OF THE DRAWINGS

FIG. 3 is a partial schematic view similar to that shown in FIG. 2, showing an alternate embodiment of the invention.

FIG. 4 is a plan view of an embodiment of the present invention used for shaping windshield glass.

DETAILED DESCRIPTION OF THE INVENTION

Figure 1:
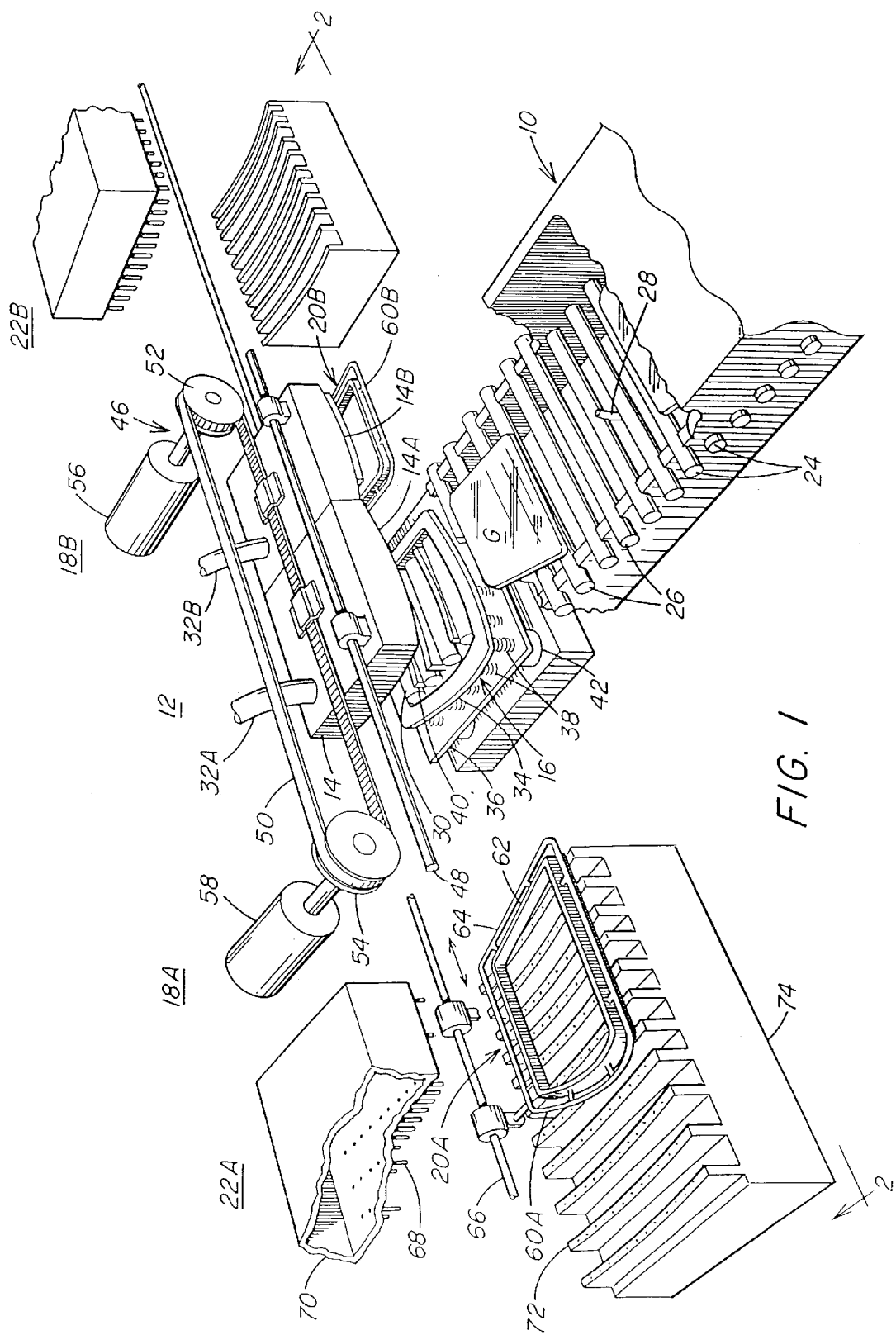
FIG. 1 is a perspective view of a preferred embodiment of the invention, with portions removed for clarity.

Referring to FIG. 1, an apparatus for shaping and treating heat softenable materials, such as glass but also including plastic and other sheet materials, includes a tunnel-type furnace 10 through which a series of glass sheets G is conveyed from a loading station (not shown) at the upstream end of the furnace 10, along a generally horizontal path to a shaping station 12 where a glass sheet G is aligned between an upper vacuum mold assembly 14 and lower mold 16. Vacuum mold assembly 14 includes two glass sheet shaping surfaces 14A and 14B, each shaped to generally correspond to the desired shape of a glass sheet G. The glass sheet G is engaged by one of surfaces 14A or 14B to shape the sheet. In the particular embodiment of the invention illustrated in FIGS. 1 and 2, the lower mold 16 lifts the glass sheet G and presses it against one of surfaces 14A or 14B as will be discussed later in more detail. The glass sheet G is held against mold 14 by vacuum which then travels to position the shaping surface and glass sheet G within one of two transfer stations 18A and 18B positioned along opposing sides of the shaping station 12. The shaped sheet G is then deposited on sheet transfer means 20A or 20B and transferred to a corresponding cooling station 22A or 22B where it is controllably cooled. More particularly, if the shaped glass sheet is to be used as an automotive side or back window, it will be cooled quickly to impart at least a partial temper in the shaped glass sheet. If the shaped glass sheet is to be used in a vehicle windshield, the glass sheet is slowly cooled to anneal the glass. The glass sheet G is then transferred to a cooling conveyor (not shown) for further cooling. If desired, the shaping station 12 and transfer stations 18A and 18B may be enclosed within a heated cavity (not shown) to reduce heat loss during the shaping and transfer operation, as will be discussed later in more detail.

Heat may be supplied to the furnace 10 in any convenient manner, for example, from gas heaters or by electrical radiant heaters or a combination of both, which heat supply means is well known in the art. The furnace 10 includes a horizontal conveyor comprising longitudinally spaced transversely extending conveyor rolls 24 of a type well known in the art that define a path of travel which extends through the furnace 10. The exit end of furnace 10 includes conveyor rolls 26 which are arranged in sections so that the speed of the different conveyor sections may be controlled and synchronized in a manner well known in the art, for proper positioning and movement of the glass sheets into shaping station 12 as will be discussed later in more detail. A glass sensing element 28 is located within the furnace 10, as shown in FIG. 1, to initiate a shaping, transferring and cooling cycle.

The shaping station 12 includes vacuum mold assembly 14, lower shaping mold 16 and a series of spaced support rolls 30 of a type well known in the art, arranged to support the transverse dimension of each heat softened glass sheet G in turn as it exits the furnace 10 and enters the shaping station 12. Mold assembly 14 is preferably composed of a rigid material such as ceramic composite, cast iron, brass or steel. These materials provide a smoothly surfaced contour and good durability despite intermittent contact with hot glass that causes rapid cyclic temperature variations over an extended period. If desired, mold assembly 14 may be covered with a heat resistant cover such as stainless steel or fiber glass fabric. In addition, the mold assembly 14 may include a sheet engaging surface cooling arrangement (not shown) to cool the shaped glass sheet G while held thereagainst. This would be particularly useful in the shaping of glass sheets for windshields, wherein the sheets are subsequently annealed after shaping. As discussed above, mold assembly 14 includes shaping surfaces 14A and 14B.

Although not required, it is preferred that mold assembly 14 be constructed such that when surface 14A is in shaping station 12 aligned above lower mold 16, surface 14B is in transfer station 18B, and when surface 14B is in shaping station 12 aligned above lower mold 16, surface 14A is in transfer station 18A. Referring to FIG. 1, mold assembly 14 may incorporate the two surfaces into a single structure which is constructed so that vacuum may be independently drawn and released along each surface. As an alternative, mold assembly 14 may include two separate, spaced apart molds that move as a unit as assembly 14 shuttles through shaping station 12 and between transfer stations 18A and 18B. Vacuum is drawn along surface 14A and 14B through evacuation pipes 32A and 32B which connect assembly 14 through a suitable valve arrangement (not shown) to a vacuum source (not shown). The assembly 14 may also be provided with a pressurized air source which provides a positive pressure along surfaces 14A and 14B to help separate the heat softened glass sheet from the assembly 14 when the vacuum is released. The valves for the vacuum and pressurized air lines may be synchronized according to a predetermined time cycle in any convenient manner well known in the glass sheet bending art. If desired, the rolls 24, 26 and/or 30 may be replaced with a gas hearth support arrangement of a type well known in the art.

Figure 2:
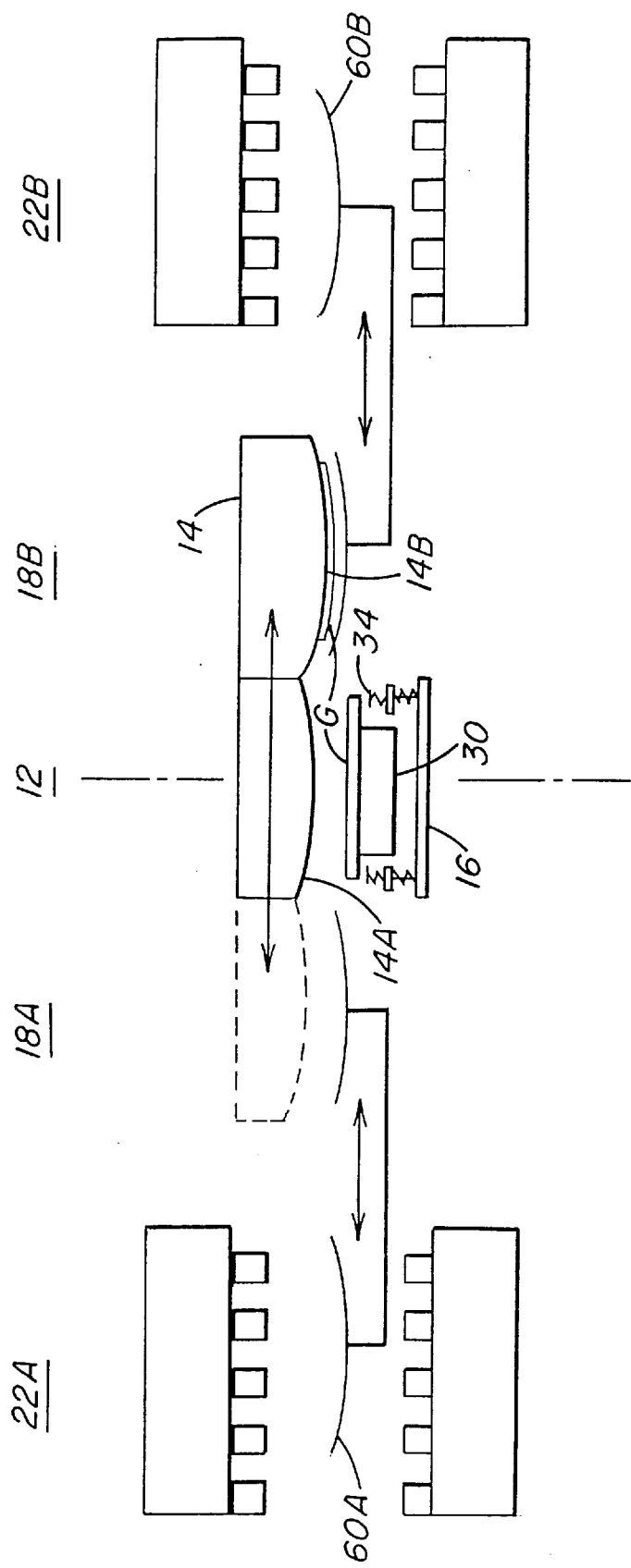
FIG. 2 is a schematic view of the invention taken along line 2—2 of FIG. 1.

Although not limiting in the present invention, in the embodiment illustrated in FIGS. 1 and 2, lower mold 16 includes a flexible ring 34 which engages the marginal edge portion of the sheet to be shaped and is capable of assuming a flat shape when unstressed and a deformed shape that conforms to the curvature of shaping surface 14A or 14B during pressing, as taught in U.S. Pat. No. 4,830,650. The flexible ring 34 is supported on a mounting plate 36 by compliant support assemblies 38 of the type known in the art. If desired, additional pressing pads 40 may be positioned within the periphery of the ring 34 to help lift center portions of the glass sheet G and press it against surfaces 14A and 14B of the assembly 14.

Mounting plate 36 is secured to an elevator means 42 so that the flexible ring 34 may be vertically reciprocated from an initial position, wherein the sheet engaging surface of the flexible ring 34 is positioned below support rolls 30 in shaping station 12, to a second position above the support rolls 30 wherein the ring 34 lifts the heat softened glass sheet off the roll 30 and presses the marginal edge portion of the sheet G against surface 14A or 14B. Support assemblies 38 allow the flexible ring 34 to engage and conform to the downwardly facing shaping surfaces 14A and 14B of the mold assembly 14. It should be appreciated that as an alternative to moving ring 34 upward between the rolls 30 to transfer the glass sheet G onto ring 34, the rolls 30 may be moved downward below ring 34 to affect the transfer. Ring 34 would then move upward and/or assembly 14 would move downward to press the heat softened glass therebetween.

Glass sheet lifting and pressing arrangements other than those illustrated in FIGS. 1 and 2 may be used to lift and press the glass sheets G against surfaces 14A and 14B of mold assembly 14. For example, the lower mold may be a non-deformable ring having a fixed shape corresponding to the final desired peripheral configuration of the glass sheet, a slotted mold as disclosed in U.S. Pat. No. 4,272,274 or an articulating ring as disclosed in U.S. Pat. No. 4,496,386. Furthermore, the lower mold 16 may be eliminated by using air jets 76 as shown in FIG. 3 of the type disclosed in U.S. Pat. No. 4,204,854 to lift the glass sheet into contact with the mold assembly 14. In addition, it should be appreciated that although the shaping surfaces of the molds in the shaping station 12 are configured to shape the glass sheet G into a convex downward configuration, as shown in FIGS. 1 and 2, they may also be shaped to form the glass to other desired curved configurations.

As shown in FIGS. 1 and 2, the vacuum mold assembly 14 is horizontally movable via a shuttle arrangement 46 (shown in FIG. 1 only) along rails 48 (only one shown) between shaping station 12 and transfer stations 18A and 18B. In the particular embodiment illustrated in FIG. 1, shuttle arrangement 46 includes a timing belt 50 secured to assembly 14 and extending between pulleys 52 and 54. The outer surface of pulleys 52 and 54 are configured to enmesh with the toothed configuration of the belt 50. If desired, belt 50 and pulleys 52 and 54 may be replaced by a drive chain and sprocket arrangement. Reversible drive 56 is positioned at pulley 52 to drive belt 50 and move assembly 14. If desired, a second drive 58 may be positioned at pulley 54 and drives 56 and 58 may work in combination to alternately shuttle assembly 14 in such a manner that drive 56 moves assembly 14 to the right, as viewed in FIG. 1, into transfer station 18B and drive 58 moves assembly 14 to the left into transfer station 18A. As an alternative, shuttle arrangement 46 may also be of the type disclosed in U.S. Pat. Nos. 4,662,925 and 4,767,434 or any other arrangement known in the art.

Transfer station 18A is similar in construction to transfer station 18B, sheet transfer means 20A is similar in construction to sheet transfer means 20B and cooling station 22A is similar in construction to cooling station 22B. The following discussion will be directed toward transfer station 18A, sheet transfer means 20A and cooling station 22A with the understanding that corresponding transfer station 18B, sheet transfer means 20B and cooling station 22B most likely are, but not required to be, identical.

Referring to FIG. 1, sheet transfer means 20A is provided at transfer station 18A to move the shaped glass sheets G from the transfer station 18A into the cooling station 22A. In the particular embodiment illustrated in FIG. 1, sheet transfer means 20A is a transfer ring 60A, e.g. as disclosed in U.S. Pat. No. 4,285,715, which includes a support rail 62 with a sheet supporting surface that follows the contours of the shaped glass sheet spaced slightly inward of the sheet's periphery. The glass sheet supporting surface of the rail 62 is preferably a non-metallic material that can support the hot glass sheet without leaving a mark on the glass sheet surface. The ring 60A is mounted on a carriage 64 which moves the ring 60A along guide rail 66 from a load position where the ring 60A is positioned in the transfer station 18A beneath shaping surface 14A to receive a shaped glass sheet, to a cooling position where the ring 60A is positioned between air nozzles in the cooling station 22A.

The cooling station 22A includes longitudinally spaced, transversely extending rows of spaced nozzles 68 extending downward from an upper platen 70 and in an opposing position to longitudinally spaced, transversely extending rows of bar nozzles 72 on a lower platen 74, e.g. as disclosed in U.S. Pat. No. 4,285,715. The bar nozzles 72 are spaced vertically below the upper nozzles 68 to provide clearance for moving the ring 60A along a path therethrough. The lower ends of the rows of the upper nozzles 68 and the upper ends of bar nozzles 72 are located along a curved surface complimenting the curved shape of the shaped glass sheet transferred therebetween.

In operation, each glass sheet G in turn is conveyed through the furnace 10 and heated to its heat softening temperature while supported across it entire width on rolls 24. Sensor 28 senses the position of a glass sheet in the series, e.g. its leading or trailing edge, and sends this information to a controller (not shown) which controls the conveying rates of rolls 24, 26 and 30. While it is possible to preset any desired program of rotational speeds for conveyor rolls 24, 26 and 30, in one particular embodiment, the program involves rotating conveyor rolls 24 within the furnace 10 at a rate of rotation sufficient to transport a series of glass sheets through the furnace 10 at a constant speed on the order of 400–450 inches (10.2–11.4 m) per minute. As each glass sheet G approaches the end of the furnace 10, the rolls 26 and 30 accelerate in sequence to increase the glass sheet's speed to a speed on the order of 1200 inches (30.5 m) per minute for transfer of the shaped glass sheet G from furnace to the shaping station 12. As the glass sheet G approaches the shaping position within shaping station 12, i.e. aligned below shaping surface 14A or 14B, which in turn is aligned above lower mold 16, the rolls 30 decelerate in unison to a glass sheet speed on the order of 700 inches (17.8 m) per minute or less at the moment the glass sheet is lifted by lower mold 16 into engagement with the mold assembly 14. Decelerating the rate of rotation of the support rolls 30 to a speed less than the accelerated speed of transfer from the furnace 10 to the shaping station 12 before the glass sheet G is lifted by lower mold 16 into engagement with and pressed against shaping surface 14A or 14B of vacuum mold assembly 14 insures a smaller variation of glass sheet position from sheet to sheet when lifted off support rolls 30.

When a glass sheet G exits furnace 10 and enters shaping station 12, the assembly 14 is positioned so that one of its engaging surfaces is at a shaping position within the shaping station 12 while its other engaging surface is at a unload position at one of the transfer stations. Referring to FIG. 2, assembly 14 is shown with engaging surface 14A at a shaping position within shaping station 12 while engaging surface 14B is at transfer station 18B. When a heat softened glass sheet G is in the proper position within shaping station 12 between engaging surface 14A and lower mold 16, the sheet G is lifted by mold 16, pressed against shaping surface 14A, and held thereagainst by vacuum drawn along surface 14A. The assembly 14 then moves to position the glass sheet G at an unload position in one of the transfer stations. More particularly, assembly 14 and the heat softened glass sheet G shuttle to the left, as viewed in FIG. 2, into transfer station 18A to position surface 14A and glass sheet G at an unload position above transfer ring 60A while surface 14B of the assembly 14 moves from an unload position within transfer station 18B to a shaping position within shaping station 12. When the glass sheet G is in proper alignment above ring 60A, the vacuum along surface 14A is terminated to deposit the sheet onto the ring 60A which then transfers the shaped glass sheet G to cooling station 22A where it is controllably cooled in a manner as discussed earlier.

As the assembly 14 moves the shaped sheet from the shaping station 12 to transfer station 18A, the next glass sheet exits the furnace 10 and moves towards shaping station 12. The movement of assembly 14 between transfer stations 18A and 18B and conveyance of the glass sheets G into shaping station 12 is coordinated such that the sheet engaging surfaces 14A and 14B are positioned within the shaping station 12 whenever a heat softened glass sheet arrives at the shaping station 12 above lower mold 16. As a result, the next glass sheet G arrives below surface 14B which is at its shaping position above mold 16 at approximately the same time as the previous glass sheet is being deposited at a transfer station 18A. Mold 16 then lifts sheet G and presses it against shaping surface 14B and vacuum is drawn along surface 14B to hold glass sheet G thereagainst. The assembly 14 then shuttles to the right, as viewed in FIG. 2, to move surface 14B and shaped glass sheet G from shaping station 12 to its unload position above transfer ring 60B in transfer station 18B. As the assembly 14 moves to the right, surface 14A moves from its unload position at transfer station 18A to its shaping position within shaping station 12 to receive the next heat softened glass sheet G. Vacuum is then terminated along surface 14B to deposit the shaped glass sheet G on transfer ring 60B at transfer station 18B which then transfers the shaped glass sheet to cooling station 22B where it is controllably cooled as the next glass sheet G enters shaping station 12 and is positioned between surface 14A and lower mold 16 of assembly 14. The cycle is repeated to shape successive glass sheets at shaping station 12 and alternately transfer the glass sheets to transfer stations 18A and 18B.

Although optimal cycle time may be achieved by depositing a shaped glass sheet from one of the sheet engaging surfaces at one of the transfer stations at the same time the next heat softened sheet is lifted and pressed against the other engaging surface, operating constraints or other conditions may result in a time delay between the arrival of one of the engaging surfaces within the shaping station 12 and the arrival of the next glass sheet G from the furnace 10. This condition however will not create a problem since there will always be an engaging surface waiting for the next glass sheet at the shaping station. As a result, the sheet may be lifted off rolls 30 and pressed to shape against one of the sheet engaging surfaces as soon as it is in the proper position within the shaping station 12.

If desired, additional shaping of the glass sheet G may be performed in the transfer stations. More particularly, the temperature of the glass sheet G may be maintained and/or the distance the sheet G drops from engaging surfaces 14A or 14B to rings 60A or 60B, respectively, may be such that when vacuum is terminated along the engaging surfaces of assembly 14, there is additional shaping of the sheet G as it contacts the rings of the sheet transfer means. This type of shaping arrangement is commonly referred to as drop forming and is disclosed in U.S. Pat. No. 4,233,049.

It should also be appreciated that the surfaces 14A and 14B of assembly 14 may have different glass sheet shaping configurations, as shown in FIG. 2. For example, surfaces 14A and 14B may correspond to the shaped configuration for the complimenting left and right side windows of a motor vehicle. It is expected that a flexible lower mold 16 of the type discussed earlier may be provided with a wide, flexible shaping ring 34 capable of lifting and shaping both glass sheets against the different shaping surfaces.

As discussed earlier, the present invention may also be used to successively shape the inner and outer glass plies for a laminated windshield. Referring to FIG. 4, the glass sheets G travel through furnace 110 to shaping station 112 to the transfer stations 118A and 118B to the annealing chambers 122A and 122B. Although not limiting in the present invention, in the particular embodiment of the invention illustrated in FIG. 4, annealing stations 122A and 122B are oriented 90 degrees relative to their corresponding transfer station 118A or 118B to form a "tuning fork" arrangement as is known in the art. This arrangement is particularly useful when fabricating inner and outer glass sheets for a laminated windshield since it keeps the glass sheets in close proximity to each other so that they may be mated after cooling to form a doublet pair that is further processed to form the windshield, as will be discussed later.

Figure 5:
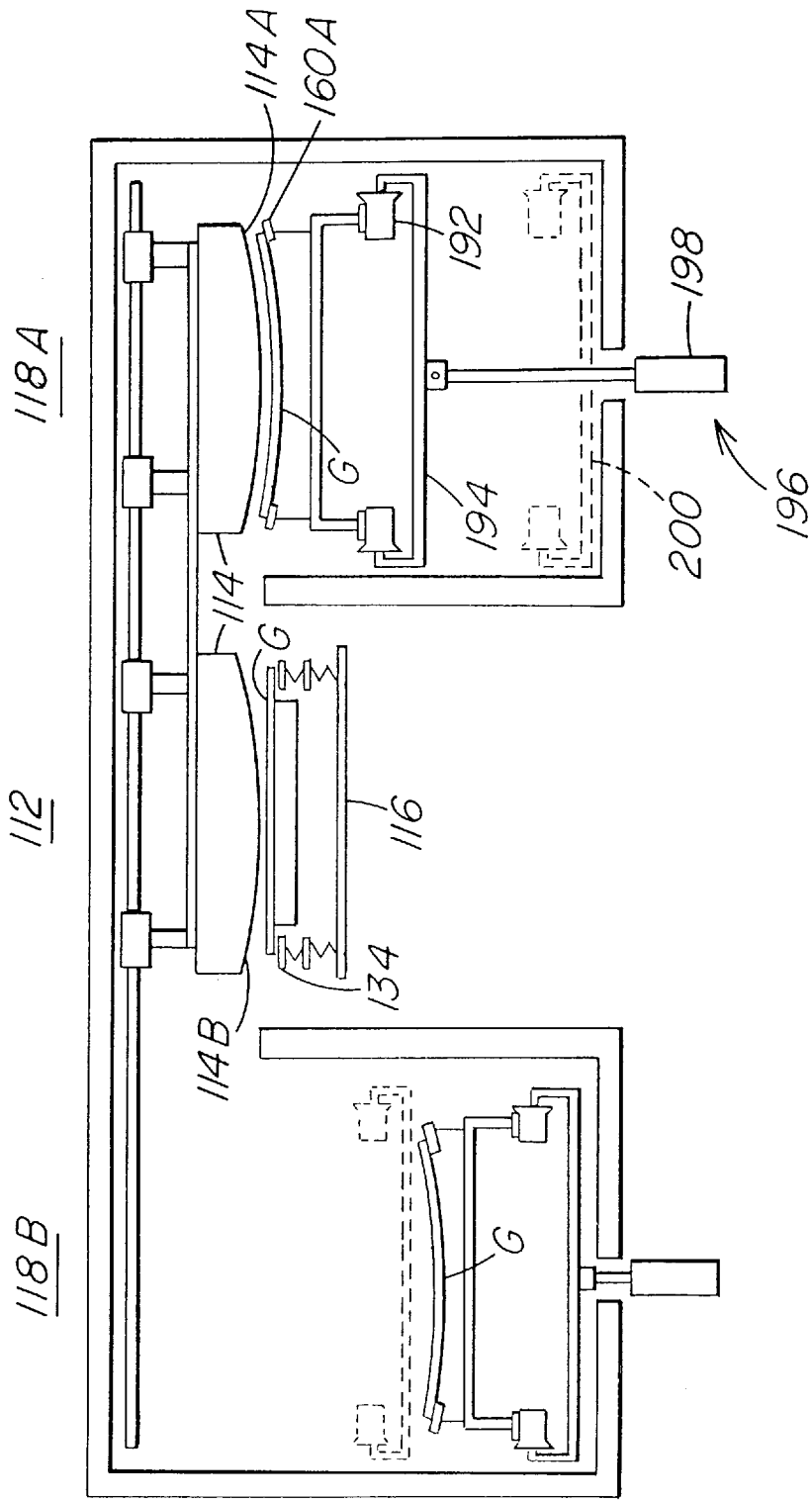
FIG. 5 is a schematic view of the invention taken along line 5—5 of FIG. 4.
Figure 6:
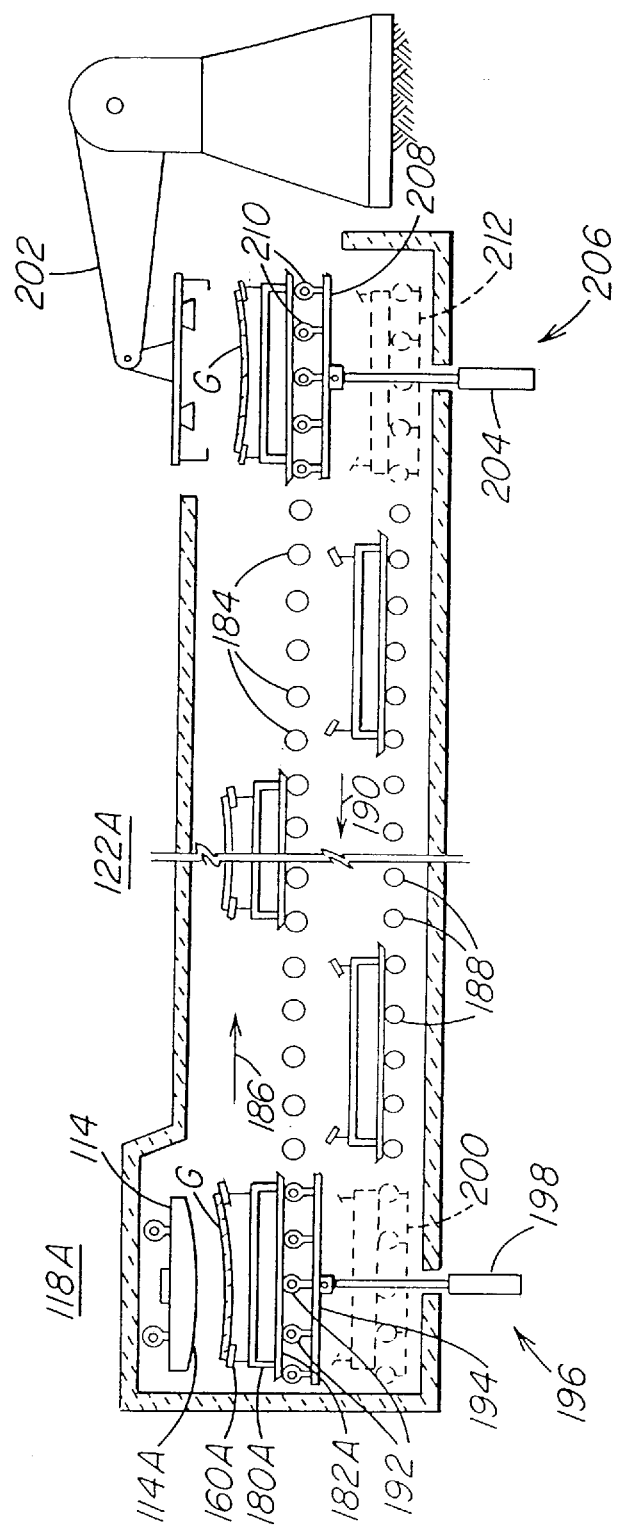
FIG. 6 is a schematic view of the invention taken along line 6—6 of FIG. 4.

When the shaping arrangement as shown in FIGS. 4 through 6 is used to fabricate windshield glass, it is preferred that the surfaces 114A and 114B of mold 114 have different sheet shaping surfaces. More specifically, surface 114A corresponds to the desired shape configuration of an outer glass ply of the windshield and surface 114B corresponds to the inner glass ply. Because the two glass plies will be combined prior to lamination, it is generally preferred that the inner ply be more curved, i.e. have a smaller radius of curvature along its surface. However, it should be noted that for windshield configurations that do not have an appreciable amount of curvature, it may not be necessary to configure surfaces 114A and 114B to two different shapes. In particular, it has been found that for simple and relatively flat windshield configurations, identically shaped glass sheets may be laminated together to form a windshield.

Referring to FIG. 4, as inner and outer glass sheets are alternately conveyed through furnace 110 and into shaping station 112, upper mold 114 is positioned so that, depending on whether sheet G is an inner or outer ply, corresponding surface 114A or 114B is positioned within shaping station 112. When properly positioned within shaping station 112, sheet G engages surface 114A or 114B of mold 114. In the particular embodiment shown in FIGS. 4 and 5, a lower mold 116 having a flexible shaping ring 134 lifts the glass sheet G and presses it against surface 114A or 114B to shape the sheet in a manner similar to that discussed earlier. Vacuum is drawn along the particular shaping surface of mold 114 to further shape the glass sheet G and hold it thereagainst as the mold 114 moves to transfer the shaped sheet G to transfer station 118A or 118B.

The following discussion is directed towards transfer station 118A and annealing chamber 122A; however, it should be appreciated that the transfer station 118B and annealing station 122B are substantially similar.

Referring to FIGS. 5 and 6, transfer station 118A is positioned at the entry end of annealing chamber 122A. In one particular embodiment of the invention, transfer station 118A and annealing chamber 122A include a dual level conveyor system that conveys a set of annealing rings 160A through the annealing chamber 122A. Each ring 160A has a sheet engaging surface generally corresponding to the peripheral configuration of the glass sheet shaped by surface 114A and is supported by a frame 180A having a rail 182A. The ring 160A and frame 180A are conveyed through the upper level of annealing chamber 122A, as indicated by arrow 186, over series of upper stub rolls 184 and through the lower level of chamber 122A, as indicated by arrow 190, over a series of stub rolls 188.

Transfer station 118A includes a set of rolls 192 supported on a frame 194 which is vertically reciprocated between the upper level of rolls 184 and lower level of rolls 188 by a lifting and lowering arrangement 196, for example, an electric or hydraulic cylinder 198. More specifically, cylinder 198 initially positions frame 194 at a lower position as shown by dotted line 200, as shown in FIGS. 5 and 6. As each annealing ring frame 180A moves from right to left, as indicated by arrow 190 shown in FIG. 6, and is positioned on roll frame 194, cylinder 198 lifts the roll frame 194 and annealing ring frame 180A within the transfer station 118A, aligning rolls 192 with upper rolls 184, and positioning ring 160A so that it may receive a shaped glass sheet G from mold 114. After vacuum along surface 114A is terminated and the shaped sheet G is deposited on ring 160A, rolls 192 are energized and frame 180A, along with the shaped sheet G supported on ring 160A, is conveyed through the upper level of the annealing chamber 122A, i.e. to the right along rolls 184 as indicated by arrow 186 in shown in FIG. 6. After frame 180A has been transferred onto rolls 184, cylinder 198 lowers frame 194 to receive the frame 180A.

Ring 160A with sheet G continues along upper rolls 184 through chamber 122A where the sheet is controllably cooled to anneal the shaped sheet. At the end of chamber 122A, sheet G is removed from ring 160A in any convenient manner. For example, the glass sheets may be automatically unloaded from frame 180A by a robot 202, as shown in FIG. 6, or the sheets may be manually removed. A cylinder 204 of lifting and lowering arrangement 206 then lowers a roll frame 208, which includes rolls 210, to position the empty frame 180A along the lower level of the annealing chamber 122A, as indicated by dotted lines 212, in a manner similar to that discussed earlier with respect to transfer station 118A. The rolls 210 are then activated and empty frame 180 is conveyed from right to left, as indicated by arrow 190 in FIG. 6, through the lower portion of chamber 122A to transfer station 118A. Cylinder 204 then raises frame 208 to receive the next ring frame 180A and sheet G.

It should be appreciated that the annealing chamber 122A and 122B could also be configured such that the shaped glass sheets G and frames 180 would travel along the lower level of the chambers while the empty frames 180 would return to the entry end of the chambers along the upper level. As an alternative, the upper and lower levels of the annealing chambers may be replaced by a side-by-side conveying system which circulates the frames through the annealing chambers.

After being removed from the annealing rings, each annealed glass sheet corresponding to an inner ply of the windshield is then mated with a glass sheet corresponding to an outer ply of the windshield to form a doublet. The two matched sheets are then conveyed into a windshield assembly area (not shown) where the windshield is assembled and subsequently laminated.

The forms of the invention shown and described in this specification represent illustrative preferred embodiments and it is understood that various changes may be made without the party from the spirit of the invention as defined in the following claimed subject matter.

We claim:

1. An apparatus for shaping heat softened sheet material comprising:

a shaping station to receive the heat softened sheet to be shaped;

first and second transfer stations positioned along opposing sides of said shaping station;

an upper vacuum mold movable between said transfer stations and within said shaping station and having first and second downwardly facing shaped sheet engaging surfaces, each having a shaped configuration generally corresponding to a final desired shape of a sheet to be shaped, wherein said sheet engaging surfaces are positioned relative to each other such that when said first sheet engaging surface is within said shaping station, said second sheet engaging surface is within said second transfer station and when said second sheet engaging surface is within said shaping station, said first sheet engaging surface is within said first transfer station;

first and second transfer rings positioned within a corresponding transfer station, each of said transfer rings having a configuration generally corresponding to a desired peripheral shape of said sheet to be shaped;

first and second cooling stations positioned adjacent a corresponding transfer station;

means to engage said heat softened sheet with one of said sheet engaging surfaces to shape said sheet when said one of said sheet engaging surfaces is within said shaping station;

means to draw a vacuum along said one of said sheet engaging surfaces to secure said sheet thereagainst at said shaping station;

means to release said vacuum to deposit said heat softened sheet from said one of said sheet engaging surfaces onto one of said transfer rings at one of said transfer stations; and means to transfer said sheet and said one of said transfer rings from said one of said transfer stations to a corresponding one of said cooling stations.

2. The apparatus as in claim 1 wherein said first sheet engaging surface has a shaped configuration different from said second sheet engaging surface.

3. The apparatus as in claim 1 wherein said means to engage and said means to release said vacuum are positioned relative to each other so as to allow said means to engage to engage a first sheet with one of said sheet engaging surfaces at said shaping station while said means to release said vacuum deposits a second sheet from the other of said sheet engaging surfaces at one of said transfer stations.

4. The apparatus as in claim 1 wherein said shaping station further includes a set of longitudinally spaced, transversely extending support rolls forming a sheet supporting surface and a lower mold vertically aligned below each of said sheet engaging surfaces when said sheet engaging surfaces are within said shaping station, and further wherein said means includes means to engage to lift said lower mold from a recessed position below said sheet supporting surface to a raised position above said sheet supporting surface to engage said sheet and press it against one of said sheet engaging surfaces.

5. The apparatus as in claim 4 wherein said lower mold includes at least an outline shaping surface having a curved configuration generally corresponding to said desired peripheral shape of said sheet to be shaped which engages a marginal edge portion of said sheet as said lower mold lifts said sheet off said sheet supporting surface and presses said sheet against one of said sheet engaging surfaces of said upper mold.

6. The apparatus as in claim 4 wherein said lower mold includes a flexible outline shaping surface having a flat configuration which engages a marginal edge portion of said sheet as said lower mold lifts said sheet off said sheet supporting surface, and a shaped configuration when said lower mold presses said sheet against one of said sheet engaging surfaces of said upper vacuum mold to conform said marginal edge portion of said sheet to a corresponding portion of said one of said sheet engaging surfaces.

7. The apparatus as in claim 1 wherein said means to engage includes a plurality of jets within said shaping station positioned below said sheet engaging surfaces when said sheet engaging surfaces are within said shaping station to direct gas at a lower major surface of said heat softened sheet and lift said sheet into engagement with said one of said sheet engaging surfaces.

8. A method of shaping heat softenable sheet material, comprising:

(a) heating a series of sheets;

(b) positioning first and second transfer stations on opposing sides of a shaping station;

(c) providing an upper vacuum mold having first and second sheet engaging surfaces each shaped to a configuration generally corresponding to the final desired configuration of a sheet to be shaped;

(d) positioning said upper vacuum mold such that said first sheet engaging surface is within said shaping station, and said second sheet engaging surface within said second transfer station;

(e) conveying a first sheet into said shaping station;

(f) engaging said first sheet with said first sheet engaging surface of said upper vacuum mold to shape said first sheet;

(g) drawing a vacuum along said first sheet engaging surface to secure said first shaped sheet thereagainst;

(h) moving said upper vacuum mold such that said first sheet engaging surface and said first shaped sheet move from said shaping station to said first transfer station, and said second sheet engaging surface moves from said second transfer station to within said shaping station;

(i) terminating said vacuum along said first sheet engaging surface to deposit said first shaped sheet onto a first shaped sheet support at said first transfer station;

(j) transferring said first shaped sheet and first shaped sheet support to a first cooling station;

(k) controllably cooling said first shaped sheet;

(l) conveying a second sheet into said shaping station;

(m) engaging said second sheet with said second sheet engaging surface of said upper vacuum mold to shape said second sheet;

(n) drawing a vacuum along said second sheet engaging surface to secure said second shaped sheet thereagainst;

(o) moving said upper vacuum mold such that said second sheet engaging surface and said second shaped sheet move from said shaping station to said second transfer station, and said first sheet engaging surface moves from said first transfer station to within said shaping station;

(p) terminating said vacuum along said second sheet engaging surface to deposit said second shaped sheet onto a second shaped sheet support at said second transfer station;

(q) transferring said second shaped sheet and second shaped sheet support to a second cooling station; and (r) controllably cooling said second shaped sheet.

9. The method as in claim 8 wherein steps (l) and (m) occur during steps (h) and (i) and steps (o) and (p) occur during steps (e) and (f).

10. The method as in claim 8 wherein said shaping station further includes a set of longitudinally spaced, transversely extending support rolls forming a sheet supporting surface and a lower mold vertically aligned below each of said sheet engaging surfaces when said sheet engaging surfaces are within said shaping station, and further wherein said engaging steps (f) and (m) each further include the steps of moving said lower mold from a recessed position below said sheet supporting surface to a raised position above said sheet supporting surface to lift said sheet and press said sheet against one of said upper vacuum mold engaging surfaces.

11. The method as in claim 10 wherein said lower mold includes a ring mold and further wherein said engaging steps (f) and (m) each further include the steps of engaging a marginal edge portion of said sheet as said ring mold lifts said sheet off said sheet supporting surface and pressing said marginal edge portion of said sheet against corresponding portions of one of said sheet engaging surfaces of said upper vacuum mold.

12. The method as in claim 8 wherein said engaging step (f) shapes said first sheet to a first configuration and said engaging step (m) shapes said second sheet to a second configuration different from said first configuration.

13. The method as in claim 8 wherein each of said engaging steps (f) and (m) further include the step of directing gas at a lower major surface of said sheet when said sheet is within said shaping station to lift said sheet into engagement with one of said sheet engaging surfaces.

14. An apparatus for shaping heat softened sheet material comprising:

a shaping station to receive the heat softened sheet to be shaped;

first and second annealing chambers, each having an entry end positioned adjacent to said shaping station;

an upper vacuum mold movable between said entry ends of said annealing chambers and within said shaping station and having first and second downwardly facing shaped sheet engaging surfaces, each having a shaped configuration generally corresponding to a final desired shape of a sheet to be shaped, wherein said sheet engaging surfaces of said upper vacuum mold are positioned relative to each other such that when said first sheet engaging surface is in said shaping station, said second sheet engaging surface is at said entry end of said second annealing chamber and when said second sheet engaging surface is in said shaping station, said first sheet engaging surface is at said entry end of said first annealing chamber;

means to engage said heat softened sheet with one of said sheet engaging surfaces to shape said sheet when said one of said sheet engaging surfaces is within said shaping station;

means to draw a vacuum along said one of said sheet engaging surfaces to secure said sheet thereagainst at said shaping station;

means to release said vacuum along said one of said sheet engaging surfaces when said one of said sheet engaging surfaces is at an entry end of one of said annealing chambers to deposit said sheet from said one of said sheet engaging surfaces onto an annealing ring positioned within said entry end of said one of said annealing chambers, said ring having a sheet supporting surface generally corresponding to a desired peripheral shape of said sheet;

means to convey said sheet and said annealing ring through said one of said annealing chambers to controllably cool said sheet;

means to remove said sheet from said ring; and means to return said ring to said entry end of said one of said annealing chambers.

15. The apparatus as in claim 14 wherein said first sheet engaging surface has a shaped configuration different from said second sheet engaging surface.

16. The apparatus as in claim 14 wherein said means to engage and said means to release said vacuum are positioned relative to each other so as to allow said means to engage to engage a first sheet with one of said sheet engaging surfaces at said shaping station while said means to release said vacuum deposits a second sheet from the other of said sheet engaging surfaces onto said annealing ring at said entry end of one of said annealing chambers.

17. The apparatus as in claim 14 wherein said shaping station further includes a set of longitudinally spaced, transversely extending support rolls forming a sheet supporting surface and a lower mold vertically aligned below each of said sheet engaging surfaces of said upper mold when said sheet engaging surfaces are within said shaping station, and further wherein said means to engage includes means to lift said lower mold from a recessed position below said sheet supporting surface to a raised position above said sheet supporting surface to engage said sheet and press it against one of said sheet engaging surfaces.

18. The apparatus as in claim 17 wherein said lower mold includes at least an outline shaping surface having a curved configuration generally corresponding to said desired peripheral shape of said sheet which engages a marginal edge portion of said sheet as said lower mold lifts said sheet off said sheet supporting surface and presses said sheet against one of said sheet engaging surfaces of said upper mold.

19. The apparatus as in claim 17 wherein said lower mold includes a flexible outline shaping surface having a flat configuration which engages a marginal edge portion of said sheet as said lower mold lifts said sheet off said sheet supporting surface, and a shaped configuration when said lower mold presses said sheet against one of said sheet engaging surfaces of said upper vacuum mold to conform said marginal edge portion of said sheet to a corresponding portion of said one of said sheet engaging surfaces.

20. The apparatus as in claim 14 wherein said means to engage includes a plurality of jets within said shaping station positioned below said sheet engaging surfaces when said sheet engaging surfaces are within said shaping station to direct gas at a lower major surface of said heat softened sheet and lift said sheet into engagement with said one of said sheet engaging surfaces.

21. The apparatus as in claim 14 wherein each of said annealing chambers includes a first level along which said sheet and ring are conveyed to controllably cool said sheet, and a second level along which said ring is returned to said entry end of said annealing chamber, and further including means to move said ring between said levels.

22. A method of shaping heat softenable sheet material, comprising:
    (a) heating a series of sheets;
    (b) positioning first and second annealing chamber on opposing sides of a shaping station;
    (c) providing an upper vacuum mold having first and second sheet engaging surfaces, each shaped to a configuration generally corresponding to a final desired configuration of a sheet to be shaped;
    (d) positioning said upper vacuum mold such that said first sheet engaging surface is within said shaping station, and said second sheet engaging surface is at an entry end of said second annealing chamber;
    (e) conveying a first sheet into said shaping station;
    (f) engaging said first sheet with said first sheet engaging surface of said upper vacuum mold to shape said first sheet;
    (g) drawing a vacuum along said first sheet engaging surface to secure said first shaped sheet thereagainst;
    (h) moving said upper vacuum mold such that said first sheet engaging surface and said first shaped sheet move from said shaping station to an entry end of said first annealing chamber, and said second sheet engaging surface moves from said second annealing chamber to within said shaping station;
    (i) terminating said vacuum along said first sheet engaging surface to deposit said first shaped sheet onto a first annealing ring positioned within said entry end of said first annealing chamber;
    (j) conveying said first shaped sheet and first ring through said first annealing chamber and controllably cooling said first shaped sheet;
    (k) removing said first shaped sheet from said first ring;
    (l) returning said first ring to said entry end of said first annealing chamber;
    (m) conveying a second sheet into said shaping station;
    (n) engaging said second sheet with said second sheet engaging surface of said upper vacuum mold to shape said second sheet;
    (o) drawing a vacuum along said second sheet engaging surface to secure said second shaped sheet thereagainst;
    (p) moving said upper vacuum mold such that said second sheet engaging surface and said second shaped sheet move from said shaping station to said entry end of said second annealing chamber, and said first sheet engaging surface moves from said entry end of said first annealing chamber to within said shaping station;
    (q) terminating said vacuum along said second sheet engaging surface to deposit said second shaped sheet onto a second annealing ring positioned within said entry end of said second annealing chamber;
    (r) conveying said second shaped sheet and second ring through said second annealing chamber and controllably cooling said second shaped sheet
    (s) removing said second shaped sheet from said second ring;
    (t) returning said second ring to said entry end of said second annealing chamber.

23. The method as in claim 22 wherein steps (m) and (n) occur during steps (h) and (i) and steps (p) and (q) occur during steps (e) and (f).

24. The method as in claim 22 wherein said shaping station further includes a set of longitudinally spaced, transversely extending support rolls forming a sheet supporting surface and a lower mold vertically aligned below each of said sheet engaging surfaces when said sheet engaging surfaces are within said shaping station, and further wherein said engaging steps (f) and (n) each further include the steps of moving said lower mold from a recessed position below said sheet supporting surface to a raised position above said sheet supporting surface to lift said sheet and press said sheet against one of said sheet engaging surfaces.

25. The method as in claim 24 wherein said lower mold includes a ring mold and further wherein said engaging steps (f) and (n) each further include the steps of engaging a marginal edge portion of said sheet as said ring mold lifts said sheet off said sheet supporting surface and pressing said marginal edge portions of said sheet against corresponding portions of one of said sheet engaging surfaces of said upper vacuum mold.

26. The method as in claim 22 wherein said engaging step (f) shapes said first sheet to a first configuration and said engaging step (n) shapes said second sheet to a second configuration different from said first configuration.

27. The method as in claim 22 wherein said conveying steps (j) and (r) move said first and second rings along a first level of said first and second annealing chambers, respectively, and prior to said returning steps (l) and (t), further including the step of transferring said first and second rings to a second level of said first and second annealing chambers, respectively.

* * * * *